(12) United States Patent
Takakura et al.

(10) Patent No.: US 8,082,652 B2
(45) Date of Patent: Dec. 27, 2011

(54) METHOD OF MANUFACTURING MOLDING DIE

(75) Inventors: Shinji Takakura, Koga (JP); Takashi Suzuki, Koga (JP); Hiroyuki Sadakuni, Wako (JP)

(73) Assignee: Sekisui Plastics Co., Ltd., Osaka (JP)

( * ) Notice: Subject to any disclaimer, the term of this patent is extended or adjusted under 35 U.S.C. 154(b) by 1161 days.

(21) Appl. No.: 11/884,906

(22) PCT Filed: Feb. 22, 2006

(86) PCT No.: PCT/JP2006/303171
§ 371 (c)(1),
(2), (4) Date: Aug. 22, 2007

(87) PCT Pub. No.: WO2006/090738
PCT Pub. Date: Aug. 31, 2006

(65) Prior Publication Data
US 2008/0141520 A1 Jun. 19, 2008

(30) Foreign Application Priority Data

Feb. 23, 2005 (JP) ................................ 2005-047758

(51) Int. Cl.
*B23P 17/00* (2006.01)
*B22C 9/02* (2006.01)

(52) U.S. Cl. .............. 29/527.5; 29/530; 164/6; 164/349
(58) Field of Classification Search .................. 29/527.3, 29/527.5, 530; 164/6, 349
See application file for complete search history.

(56) References Cited

U.S. PATENT DOCUMENTS 4,129,165 A * 12/1978 Edwards ...................... 164/7.1
4,518,031 A * 5/1985 Yamanishi et al. ........... 164/526

FOREIGN PATENT DOCUMENTS

| DE | 102 31 567 A1 | | 1/2004 |
| JP | 57-058950 A | | 9/1982 |
| JP | 04216925 A | * | 8/1992 |
| JP | 9-207136 A | | 8/1997 |
| JP | 3045015 U | | 10/1997 |

OTHER PUBLICATIONS

Konig; "Fertigungsverfahren"; Massivumformung, 4th Ed.; 1995; pp. 6-15; vol. 4; VDI Verlag Dusseldorf; ISBN-3-18-401519-X.

* cited by examiner

*Primary Examiner* — Jermie Cozart
(74) *Attorney, Agent, or Firm* — The Webb Law Firm

(57) ABSTRACT

There are provided a method of manufacturing a molding die that can prevent occurrence of a trouble, such as break of a sand mold when a master mold is pulled out, and a molding die that can clearly transfer a pattern onto a molding. A meshed member is fixed to an entirety or part of a molding surface of a master mold, a sand mold having a molding surface with a protrusion and recess pattern thereon is fabricated by using the master mold, and a molding die having a molding surface with the protrusion and recess pattern thereon is cast by using the sand mold. The meshed member is made up of a flexible synthetic resin sheet having a number of mesh openings.

6 Claims, 15 Drawing Sheets

FIG. 1
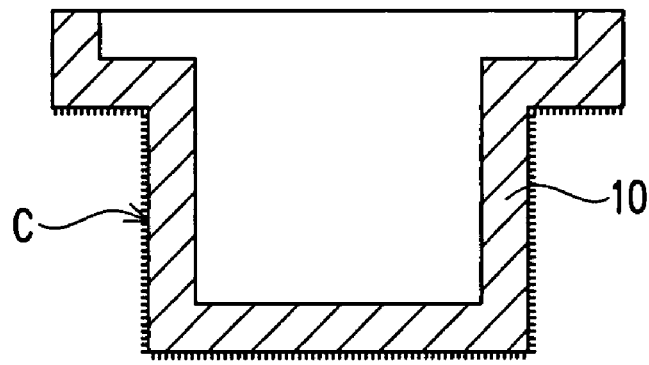
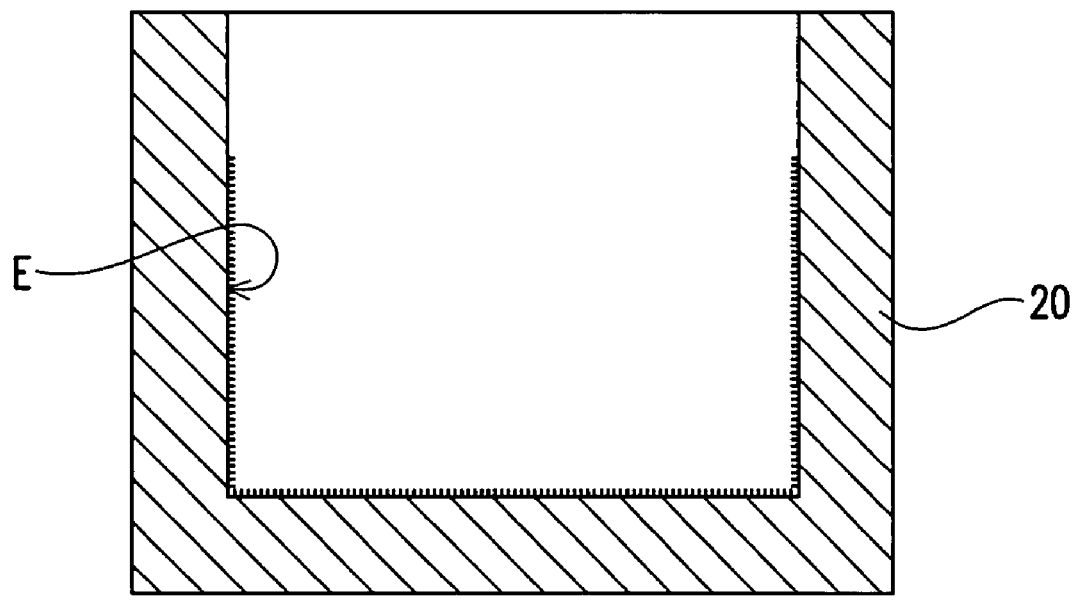

F I G. 3
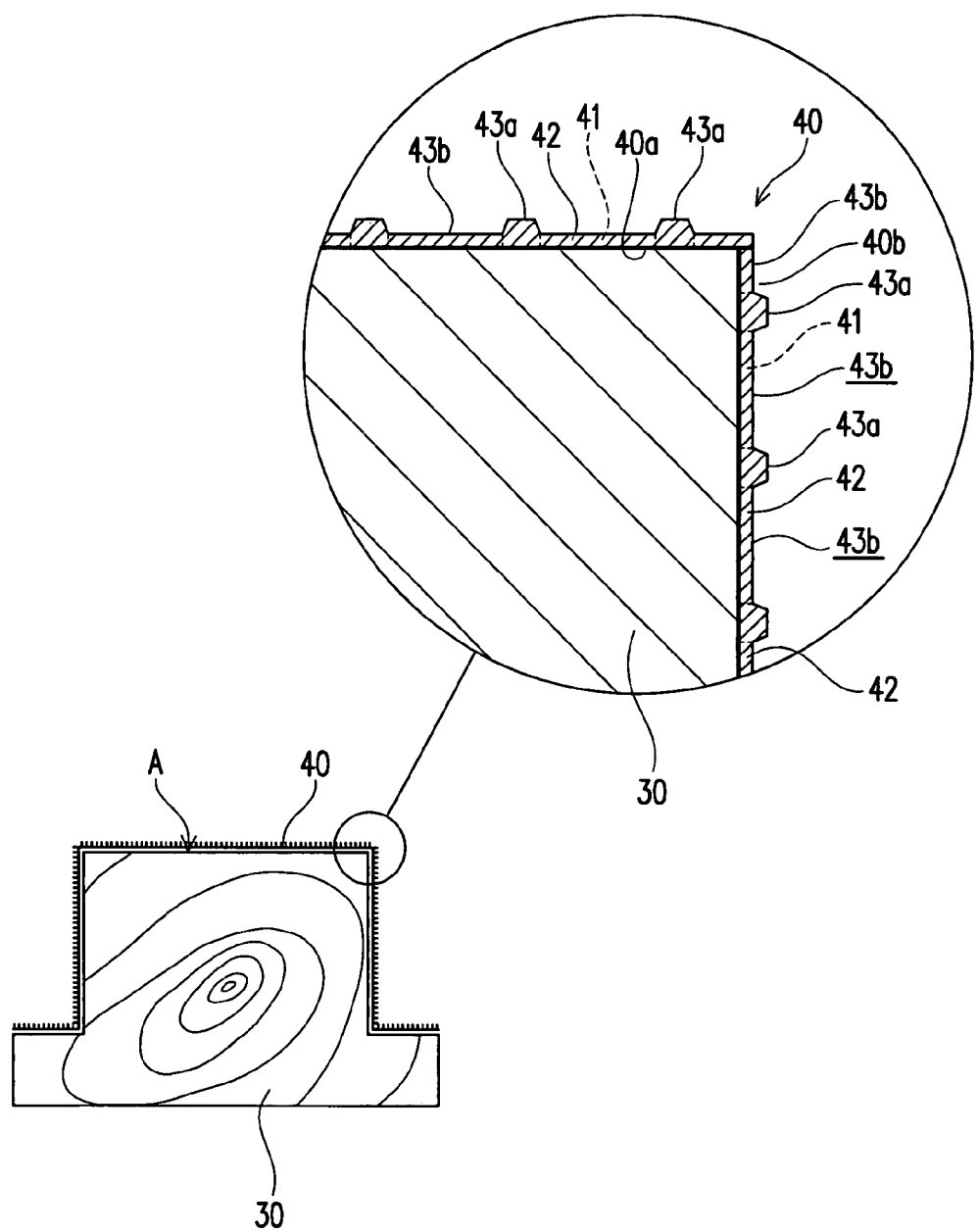

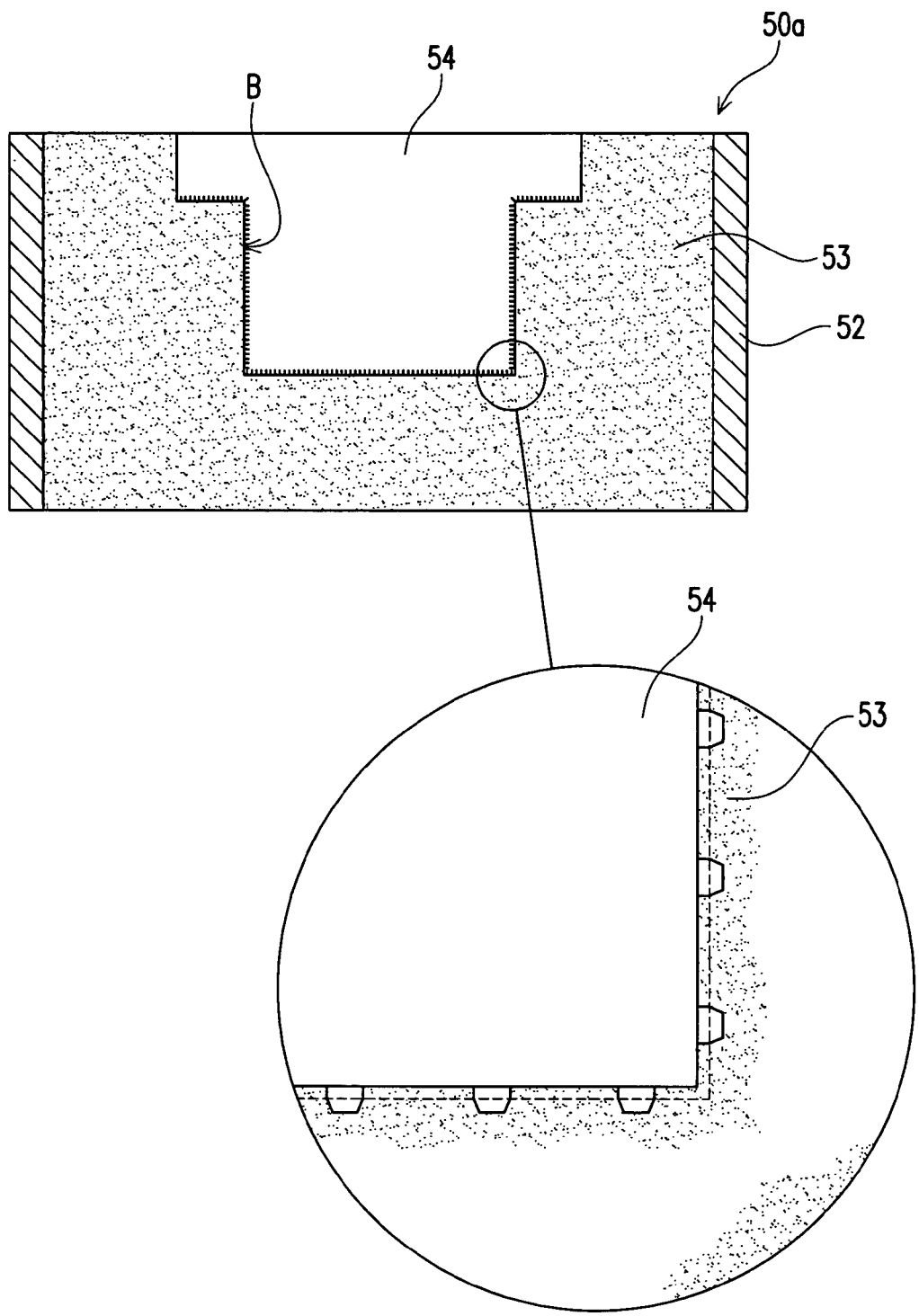

METHOD OF MANUFACTURING MOLDING DIE

BACKGROUND OF THE INVENTION

1. Technical Field

The present invention relates to a method of manufacturing a molding die that is used in molding expandable resin particles of a thermoplastic resin into an expanded molding and is capable of forming a protrusion and recess pattern on a surface of the expanded molding, as well as to an expanded molding.

2. Background Art

An expanded molding of a thermoplastic resin such as polystyrene, polyethylene or polypropylene is manufactured by means of a molding die that includes a first molding die of a fixed side and a second molding die that is movable in a die closing and opening direction relative to the first molding die, in which the molding die forms a molding cavity matched in shape to a target expanded molding when it is closed, by filling expandable resin particles of a thermoplastic resin in the molding cavity, then heating the expandable resin particles within the molding cavity by heating medium such as steam, thereby expanding the expandable resin particles and fusing the same together.

However, the above method has a problem in that a honeycomb pattern of the expandable resin particles is formed on the surface of the expanded molding that has been manufactured by the expansion and fusing of the expandable resin particles, and this deteriorates an appearance of the expanded molding.

Therefore, a molding die having a protrusion and recess pattern is broadly used. This molding die has a protrusion and recess pattern preformed on its molding surface so that this protrusion and recess pattern is transferred onto the surface of an expanded molding, thereby making the honeycomb pattern of the expandable resin particles insignificant and thus enabling manufacturing of an expanded molding having a good appearance.

Conventionally, as a known method of manufacturing a molding die having a protrusion and recess pattern, for example Japanese Utility Model Registration No. 3045015 describes a method of manufacturing a molding die, which includes first fixing a wire mesh or punching metal onto a surface of a wooden mold (master mold), fabricating a sand mold having a protrusion and recess pattern transferred from the wire mesh or punching metal by using the wooden mold, and then casting a molding die having a protrusion and recess pattern transferred from the sand mold by using the sand mold.

However, the method involving fixing the wire mesh onto the wooden mold has a problem in that, due to the woven structure of the wire mesh having wires of the mesh woven to be overlapped and intersected with each other, gaps are caused between the wooden mold and the wire mesh by the overlapped and intersected wires, and when a sand mold is fabricated by using this wooden mold, molding sands invade into the inside of the wire mesh through the gaps between the wooden mold and the wire mesh, thereby causing a trouble, such as break of the sand mold when the wooden mold is pulled out.

According to the method involving fixing the punching metal onto the wooden mold, it is difficult to fix the punching metal to the wooden mold while bringing the punching metal completely into conformity with a curved molding surface or angular recess of the wooden mold, since the punching metal is rigid and has little flexibility. Thus, there is a problem in that the punching metal can be used only for a wooden mold having a relatively simple shape with no curved surface or angular recess.

Patent Document 1: Japanese Utility Model Registration No. 3045015

DISCLOSURE OF THE INVENTION

Problems to be Solved by the Invention

A problem to be solved lies in that molding sands invade between a master mold and a member for transferring a protrusion and recess pattern thereto, and hence the protrusion and recess pattern cannot be clearly transferred to a molded surface of a molding.

SUMMARY OF THE INVENTION

Means for Solving the Problems

According to the present invention, there is provided a method of manufacturing a molding die for molding an expanded molding made of a thermoplastic resin, which is characterized in that it includes fixing a meshed member to an entirety or part of a molding surface of a master molding, fabricating a sand mold having a molding surface with a protrusion and recess pattern thereon by using the master mold, and then casting a molding die having a molding surface with a protrusion and recess pattern thereon by using the sand mold, in which a meshed resin sheet having a number of mesh openings is used as the meshed member. According to this method, unlike a wire mesh, the meshed member do not have overlapped and intersected portions of linear elements forming meshes, and therefore the meshed member is tightly fixed to the master mold, so that gaps into which molding sands invade are not caused between the master mold and the meshed member. In addition, since the resin sheet is used as the meshed member, the meshed member can be easily deformed to tightly conform to the molding surface of the master mold.

The sheet has linear elements that form meshes, in which the linear elements are formed flat on a first side of the sheet, and the sheet is fixed to the master mold to have the first side thereof positioned inward. With this sheet, the meshed member is fixed more tightly to the master mold.

The sheet has linear elements that form meshes, in which the linear elements are formed with protrusions and recesses on a second side of the sheet, and the sheet is fixed to the master mold to have the first side thereof positioned inward. With this sheet, in addition to the protrusion and recess pattern transferred from the meshed pattern of the sheet, a protrusion and recess pattern can be transferred from a protrusion and recess shape of each linear element to the sand mold.

The linear elements respectively have raised intersection portions defining protrusions, and recesses between the intersection portions, on the second side of the sheet. With this sheet, a great difference in height between the meshes and the intersection portions of the linear elements is produced, so that the protrusion and recess pattern is clearly transferred to the sand mold.

According to another aspect of the present invention, there is provided a molding die for molding an expanded molding made of a thermoplastic resin, characterized in that it is formed by fixing a resin sheet as a meshed member having a number of mesh openings to an entirety or part of a master mold so as to transfer a meshed protrusion and recess pattern to a sand mold by using the master mold, and transferring the protrusion and recess pattern of the sand mold to a molding surface of the molding die. According to this molding die, a protrusion and recess pattern transferred from a meshed pattern of the resin sheet is transferred without modification or change to a molded surface of an expanded molding of a thermoplastic resin and therefore a protrusion and recess pattern is clearly formed on the molded surface.

Advantages of the Invention

According to the method of manufacturing a molding die of the present invention, since the meshed member is tightly fixed to the master mold and therefore gaps into which molding sands invade are not caused, a trouble, such as break of the sand mold when the master mold is pulled out, is unlikely to occur. Thus, it is possible to manufacture a molding die having a highly excellent protrusion and recess pattern formed on the molding surface. Since the meshed member can be easily deformed to tightly conform to the molding surface of the master mold, it can be applied to a master mold having a molding surface of a complicated shape such as a three-dimensional shape. Furthermore, since a protrusion and recess pattern can be clearly transferred to the sand mold by the meshed member, a protrusion and recess pattern can be clearly transferred to a molding die cast by using the sand mold. Thus, a protrusion and recess pattern can be clearly formed on an expanded molding formed by using the molding die.

According to the molding die of the present invention, a protrusion and recess pattern can be transferred from a meshed pattern of a resin sheet to a molding surface and therefore a clear protrusion and recess pattern is formed on the molding surface. Thus, a clear protrusion and recess pattern can be transferred to an expanded molding of a thermoplastic resin.

BRIEF DESCRIPTIONS OF THE DRAWINGS

FIG. 1 is a cross sectional view illustrating a molding die in a die opening position according to an embodiment of the present invention.

FIG. 3 is a cross sectional view illustrating a wooden mold for a convex mold with a meshed member fixed thereto, of the same embodiment.

FIG. 7 is a cross sectional view illustrating a lower mold of a sand mold for a convex mold, of the same embodiment.

DESCRIPTION OF REFERENCE NUMERALS

Figure 2:
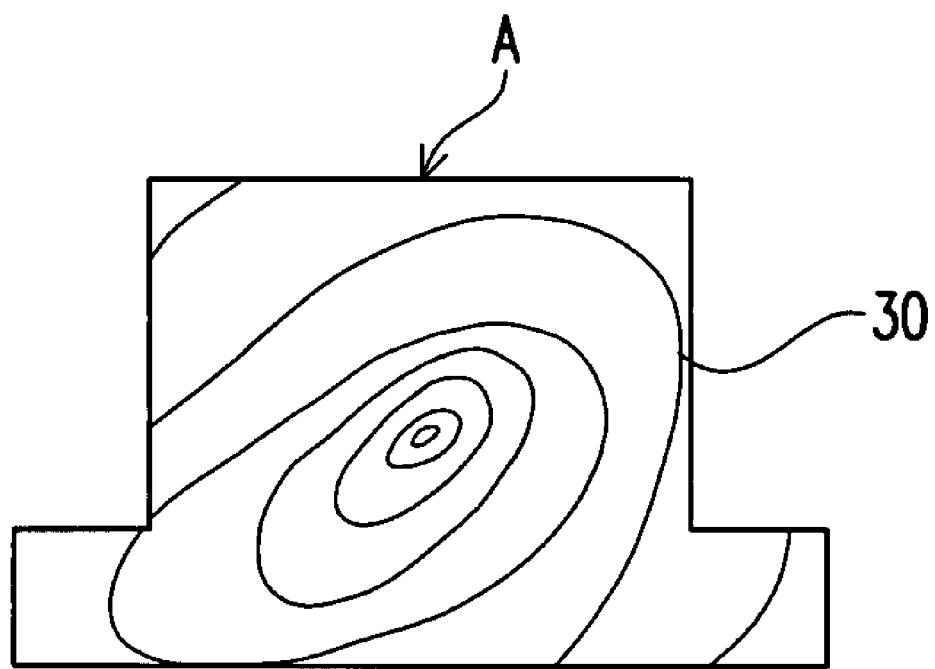
FIG. 2 is a cross sectional view illustrating a wooden mold (master mold) for a convex mold, of the same embodiment.
Figure 4:
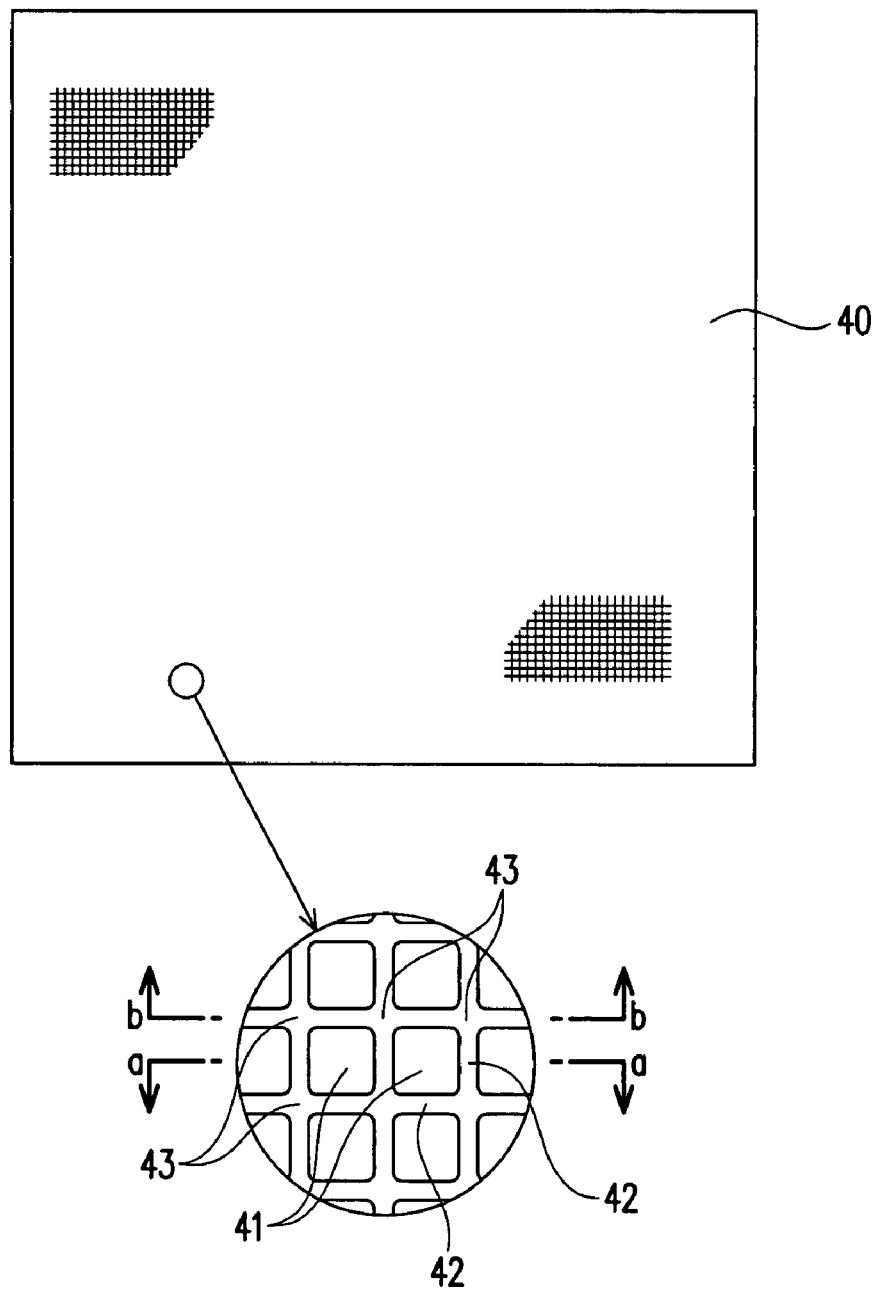
FIG. 4 is an explanatory view illustrating the meshed member of the same embodiment.
Figure 5:
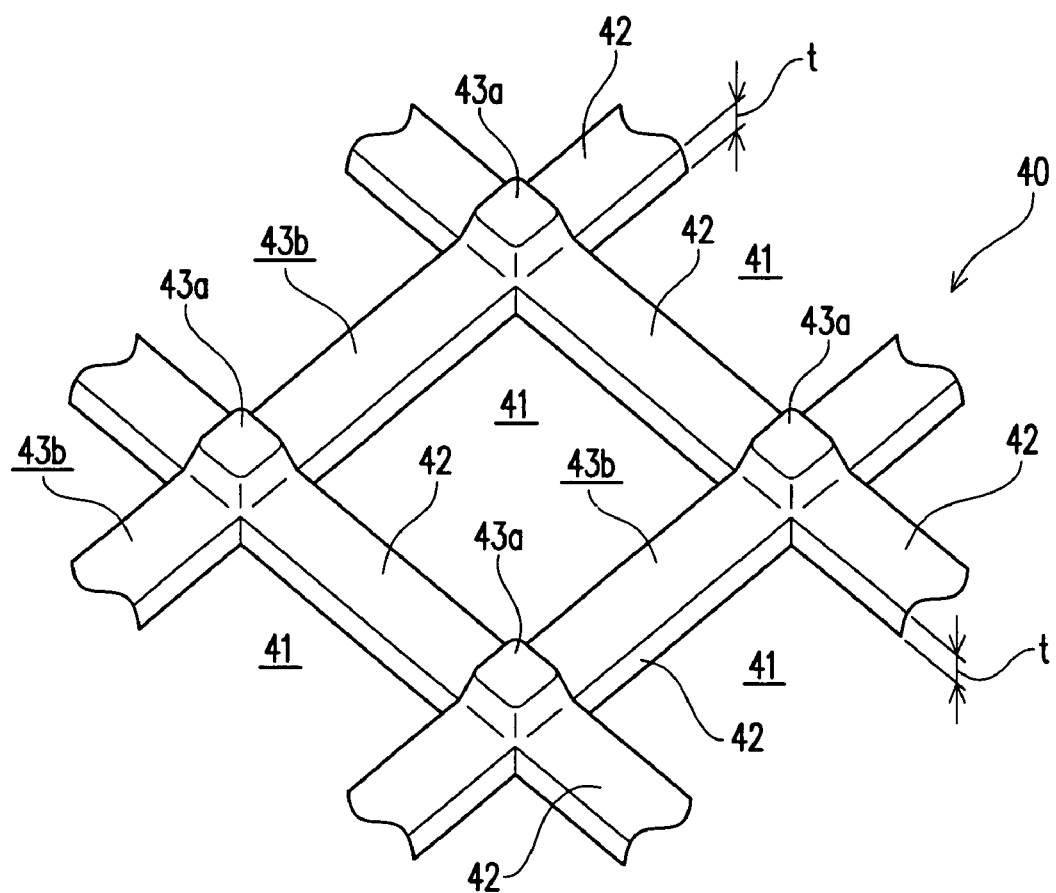
FIG. 5 is an enlarged view illustrating a portion of the meshed member, of the same embodiment.
Figure 6A:
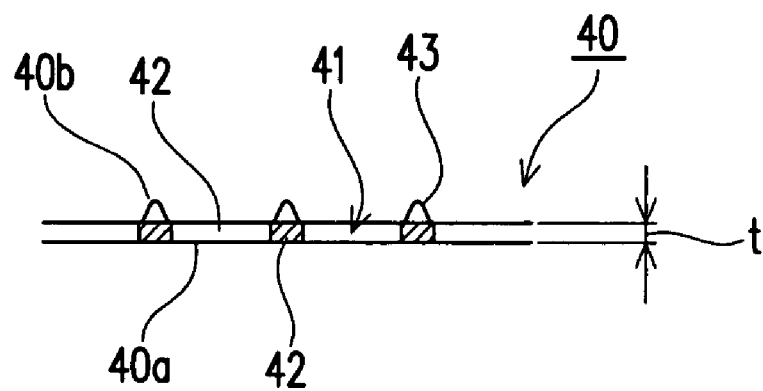
FIG. 6(a) is a cross sectional view taken along a line a-a in FIG. 4.
Figure 6B:
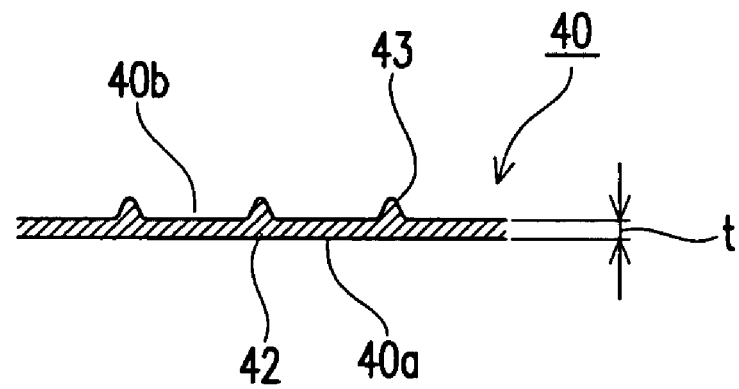
FIG. 6(b) is a cross sectional view taken along a line b-b in FIG. 4, of the same embodiment.

10: convex molding die (convex die)
20: concave molding die (concave die)
30: wooden mold (master mold for a convex die)
40: meshed member
40a: first side
40b: second side
41: mesh openings (meshes)
42: linear element
43: intersection portion
43a: protrusions (ridges)
43b: recesses
50: sand mold
50a: lower mold of a sand mold
50b: upper die of a sand mold
51: base
52: sand-mold-fabricating frame
53: molding sands
54: cavity
55: pouring gate
60: wooden mold for a convex mold (master mold for a concave die)
A-E: molding surfaces
t: thickness of a linear element

DETAILED DESCRIPTION OF THE INVENTION

Best Mode for Carrying Out the Invention

Now, the description will be made for a method of manufacturing a molding die of the present invention and for a molding die with reference to the attached drawings. A molding die for molding expanded moldings according to an embodiment of the present invention is made up of a pair of molding dies, specifically a convex molding die (hereinafter referred to a convex die) 10 and a concave molding die (hereinafter referred to a concave die) 20.

In manufacturing the convex die 10, as illustrated in FIG. 2, a wooden mold (master mold) 30 for a convex die, which has a molding surface corresponding in shape to the convex die 10, is prepared. A wooden mold 30 is fabricated by appropriate machining of wood or the like using a cutting tool. A molding surface A may have both a flat surface and a curved surface.

Then, as illustrated in FIG. 3, a meshed member 40 is fixed to the molding surface A of the wooden mold 30. The meshed member 40 is, as illustrated in FIGS. 3 to 6, formed by a meshed, flexible synthetic resin sheet having a number of mesh openings 41 across the entire surface. With a mesh (mesh opening 41) acting as a recess, the mesh (mesh opening 41) is defined by linear elements 42 crossing each other, and thus the linear elements 42 defining meshes act as protrusions.

The linear elements 42 of the meshed member 40, which define the meshes, are formed flat on a first side 40a and formed with protrusions and recesses on a second side 40*b*, and the meshed member 42 is fixed to the molding surface A of the wooden mold 30 to have the first side 40*a* positioned inward. The linear elements 40 defining the meshes (mesh openings 41) respectively have raised intersection portions 43 defining protrusions (ridges) 43*a*, and recesses 43*b* between the intersection portions 43, relative to the protrusions 43*a*, on the second side 40*b* of the meshed member 40. The protrusions 43*a* each have a substantially square pyramid shape having a dimension reduced as it advances away from the corresponding intersection portion 43 towards a top (cf. especially FIG. 5). The synthetic resin sheet may have such a thickness as to enable the meshes to form protrusions of a protrusion and recess pattern on a hereinafter-described sand mold 50.

Each mesh opening 41 of the meshed member 40 has usually a size in a range of 0.5 mm×0.5 mm to 5.0 mm×5.0 mm, and preferably 1.5 mm×1.5 mm to 3.5 mm×3.5 mm. Whereby, an expanded molding having an insignificant honeycomb pattern of expandable resin particles can be efficiently manufactured.

The meshed member 40, which is made of a synthetic resin and formed into a sheet-like shape, is soft (flexible), and therefore even if the wooden mold 30 has a complicated molding surface A having a three-dimensional shape, or the wooden mold 30 has a rounded outer circumferential surface, the meshed member 40 can be easily deformed to tightly conform to the molding surface A of the wooden mold 30. As a material of the meshed member 40, it can be cited a resin such as polyethylene, polypropylene, polyvinylchloride and polyester, or a copolymer thereof.

The meshed member 40 may be formed by, for example, punching rectangular or circular openings in a synthetic resin sheet and subjecting the sheet to stretching process. Therefore, the meshed member 40 has a meshed body, in which the linear elements 42 defining the meshes are not overlapped and intersected with each other (the linear elements 42 are not overlapped in a thicknesswise direction at an intersection portion). With this, unlike a wire mesh, the meshed member 40 do not have portions, in which the linear elements defining the meshes are overlapped and intersected with each other, and therefore the meshed member 40 can be tightly fixed to the wooden mold 30, so that unnecessary gaps are not caused between the wooden mold 30 and the meshed member 40.

The meshed member 40 is cut into a shape corresponding to the molding surface A of the wooden mold 30 and bonded to the molding surface A of the wooden mold 30 by adhesive or the like.

Figure 8:
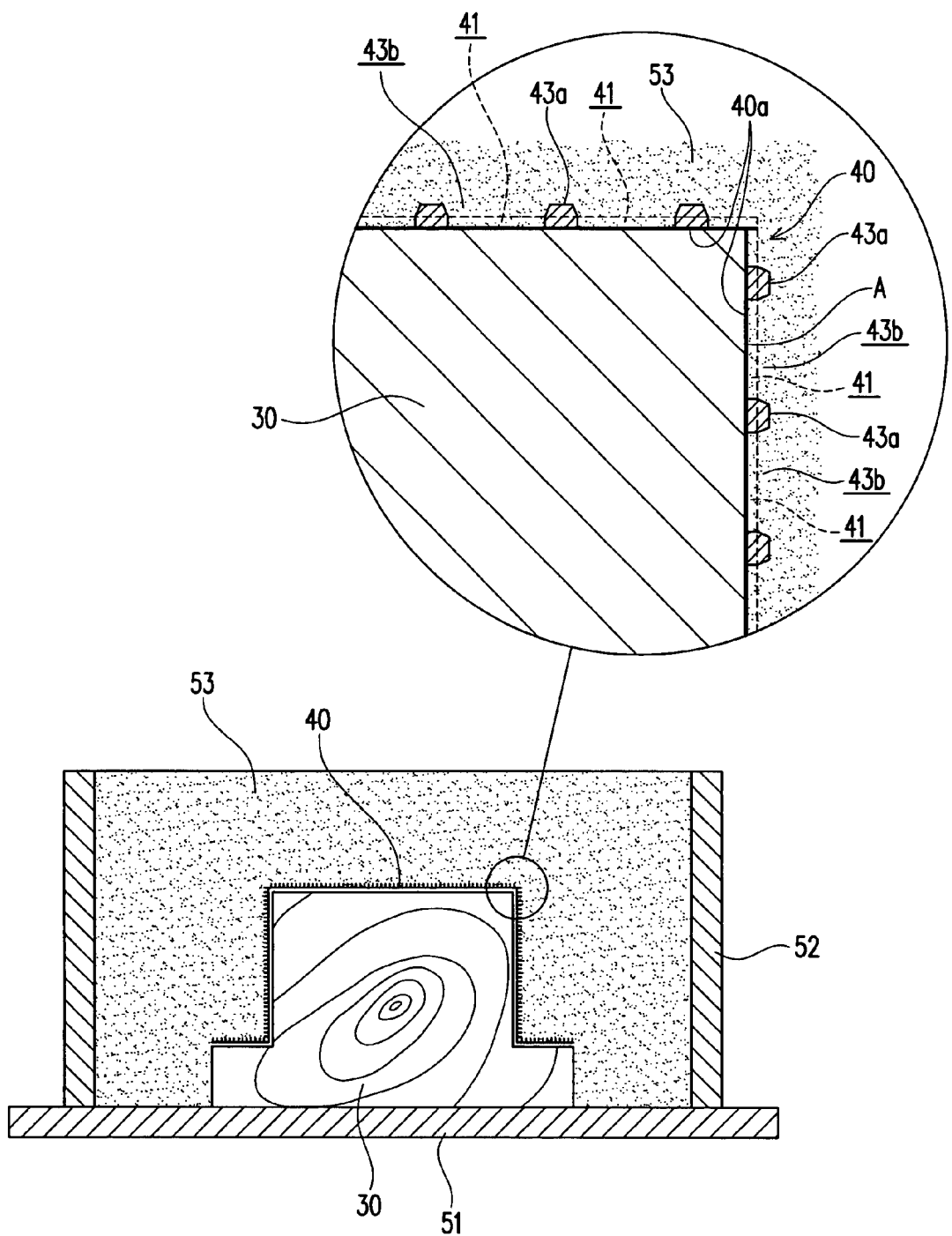
FIG. 8 is an explanatory view illustrating a step of fabricating a lower mold of the sand mold for a convex mold, of the same embodiment.

Now, the description will be made for a fabrication manner of a lower mold 50*a* of the sand mold 50 as illustrated in FIG. 7 using the wooden mold 30. Specifically, as illustrated in FIG. 8, the wooden mold 30 is mounted on a base 51, and surrounded by a sand-mold-fabricating frame 52 so as to be located at the center. Then, molding sands 53 are filled in the sand-mold-fabricating frame 52 to have the wooden mold 30 buried. At this moment, as illustrated in FIG. 8, the meshes or mesh openings 41 of the meshed member 40 are also filled with the molding sands 53. Since the first side 40*a* of the meshed member 40 is formed flat and this first side 40*a* is fixed to the molding surface A of the wooden mold 30, the molding sands 53 are unlikely to invade between the first side 40*a* of the meshed member 40 and the molding surface A of the wooden mold 30. Then, the molding sands 53 filled in the sand-mold-fabricating frame 52 are solidified into its molded shape by filling carbon dioxide gas. Then, the sand-mold-fabricating frame 52 is placed upside down and the wooden mold 30 is pulled out. Thus, the lower mold 50*a* of the sand mold 50 having a cavity (a cavity having a reversed shape of the wooden mold) 54 as illustrated in FIG. 7 can be fabricated. Even in a case where the protrusions 43*a* of the meshed member 40 project in a direction crossing the pulling out direction of the sand mold 50, the protrusion and recesses of the sand mold 50 on the surface along the pulling-out direction of the sand mold 50 are unlikely to be broken when pulling out the wooden mold 30 thanks to the relationship between the solidified hardness of the molding sands 53 and the flexibility of the meshed member 40. Since the protrusions 43*a* each are formed into a substantially square pyramid shape with a size reduced as it advances towards the top, as illustrated in FIG. 8, little resistance is caused by the protrusions 43*a* in the pulling-out direction of the wooden mold 30 on the upper side of the wooden mold 30. Therefore, by pulling out the wooden mold 30, as illustrated in FIG. 7, a protrusion and recess pattern transferred without modification or change from the meshed member 40 is formed on the surface (molding surface) B opposite to the molding surface A of the wooden mold 30, in the lower mold 50*a* of the sand mold 50.

Figure 9:
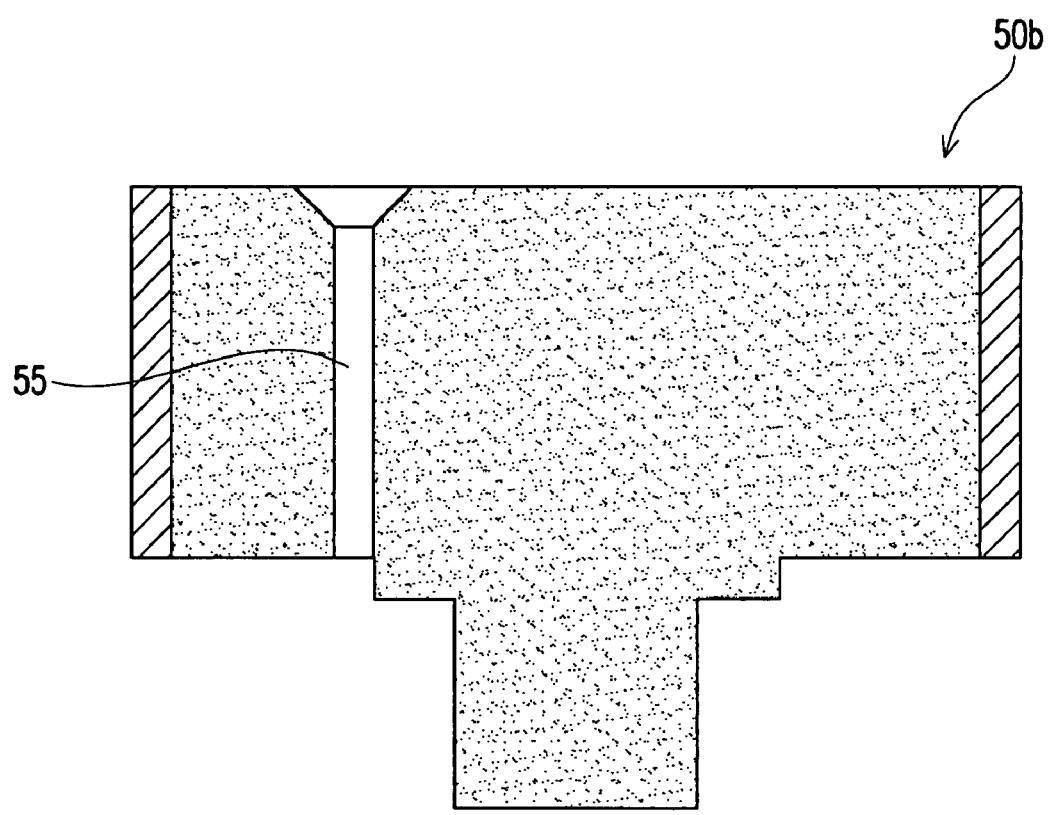
FIG. 9 is a cross sectional view illustrating an upper mold of the sand mold for a convex mold, of the same embodiment.

Then, an upper mold 50*b* of the sand mold 50 as illustrated in FIG. 9 is fabricated. The upper mold 50*b* has a pouring gate 55 that communicates with the cavity 54 of the lower mold 50*a*. This upper mold 50*b* is fabricated in the same manner as the lower mold 50*a* by using a pouring-gate rod (not shown) for forming the pouring gate 55.

Figure 10:
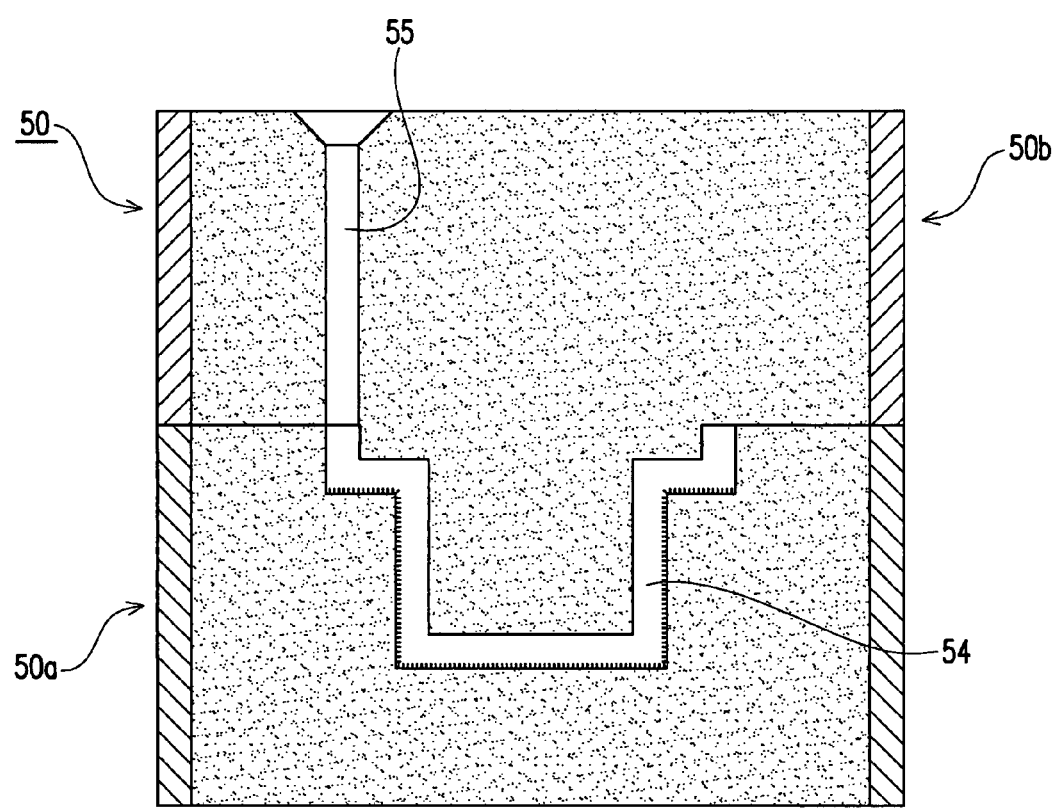
FIG. 10 is a cross sectional view illustrating a sand mold for a convex mold, of the same embodiment.
Figure 11:
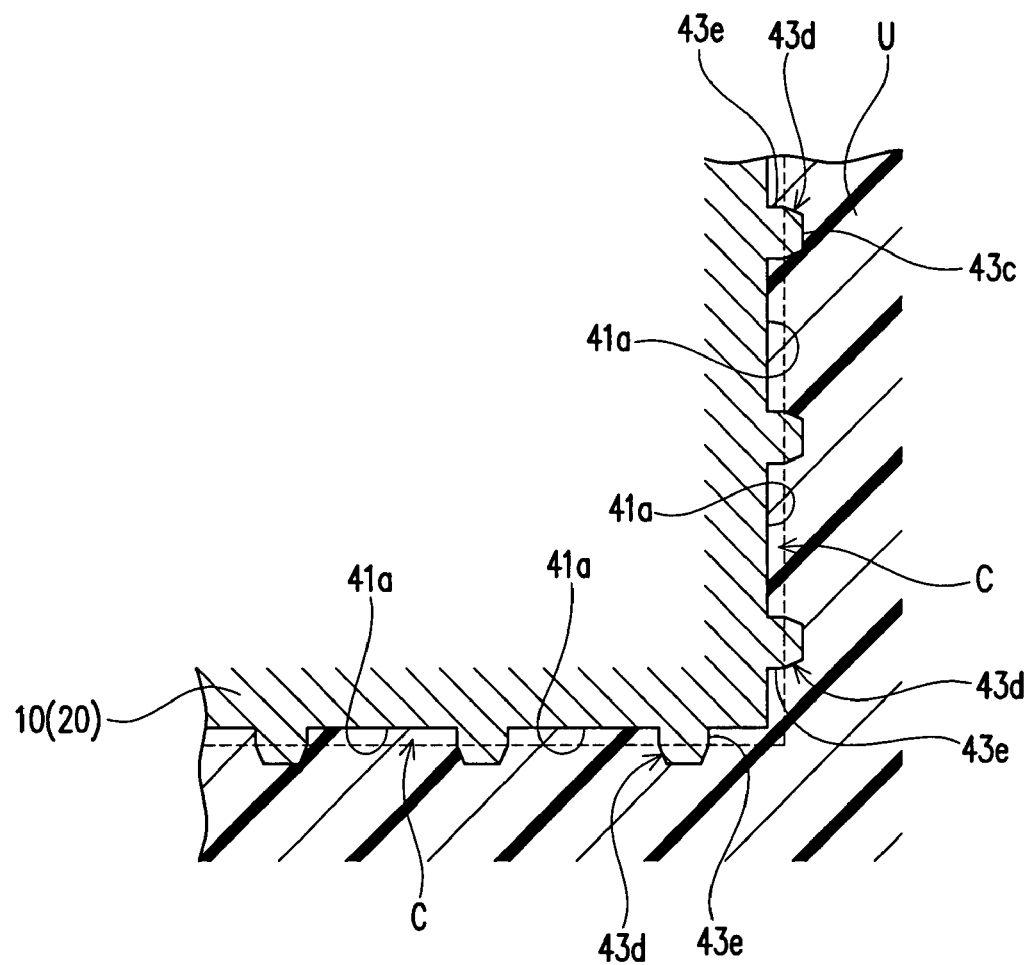
FIG. 11 is an enlarged cross sectional view of a planar surface portion when an expanded mold was formed by a molding die of the same embodiment.
Figure 12:
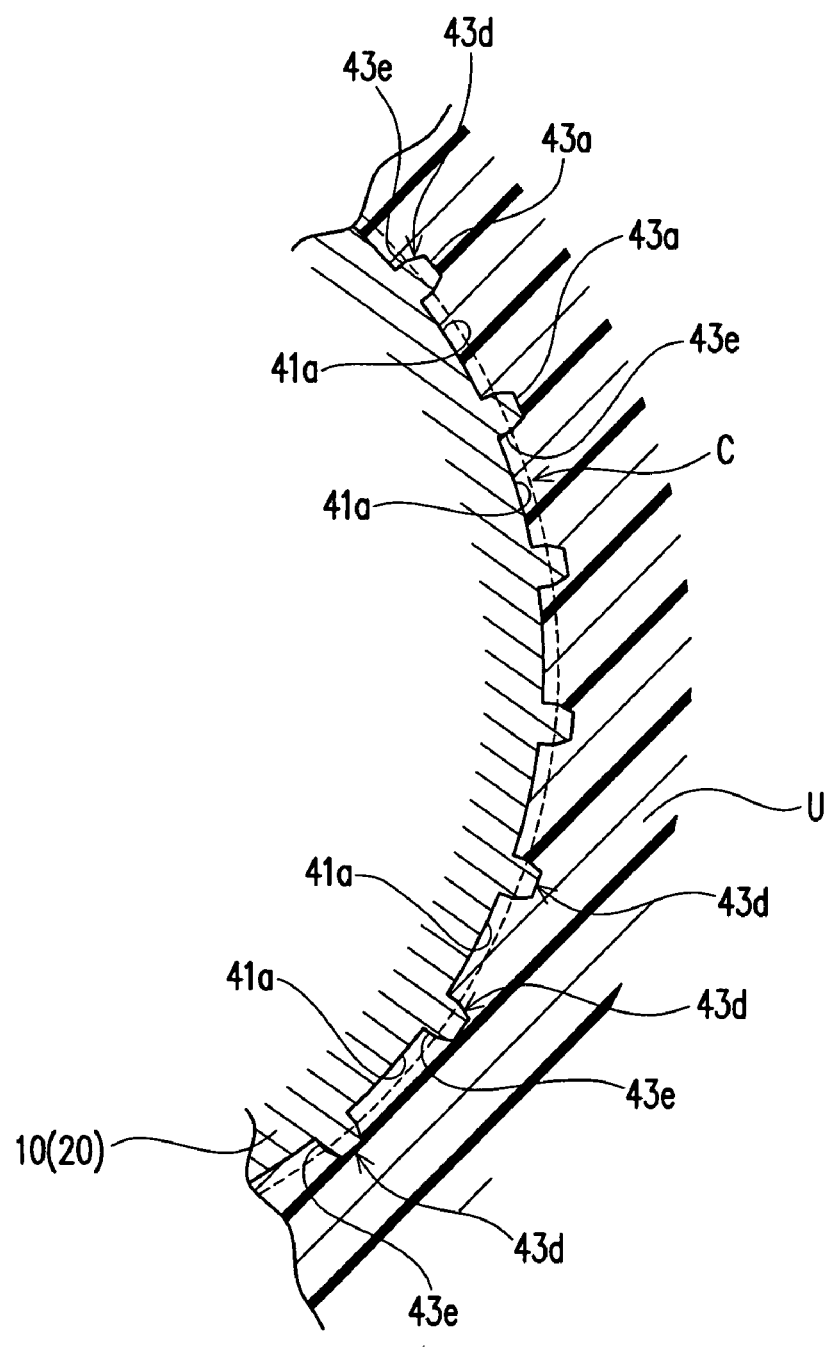
FIG. 12 is an enlarged cross sectional view of a curved portion when an expanded mold was formed by a molding die of the same embodiment.

Then, as illustrated in FIG. 10, the sand mold 50 is formed by combining the thus fabricated lower mold 50*a* and upper mold 50*b* together and the convex die 10 is fabricated by the casting using this sand mold 50. Specifically, as illustrated in FIG. 10, the upper mold 50*b* is combined with the upper side of the lower mold 50*a* of the sand mold 50, then a molten metal is poured through the pouring gate 55 of the upper mold 50*b* into the cavity 54 formed by the combination of the lower mold 50*a* and the upper mold 50*b*, and then solidified and cast into the convex die 10. Whereby, as illustrated in FIGS. 1, 11 and 12, a protrusion and recess pattern transferred from the sand mold 50 is formed on a surface (molding surface) C of the convex die 10 opposite to the mounting surface B of the sand mold 50. In the protrusion and recess pattern of the convex die 10, recessed surfaces 41*a* corresponding to the meshes (mesh openings 41) are innermost surfaces, while surfaces 43*c* corresponding to the tops of the protrusions 43*a* are outermost surfaces. Furthermore, surfaces 43*d* extending in a protruding direction continuously from both the surfaces 41*a*, 43*c* each contain a surface 43*e* corresponding to the thickness of the linear elements 42 of the meshed member 40. The surfaces 43*e* corresponding to the thickness of the linear elements 42 correspond to portions formed by the transferring of wall surfaces of the mesh openings 41, and therefore they are preferably formed parallel to each other in the protruding direction. For a material of the convex die 10, aluminium or aluminium alloy is preferably used. Although not shown in the convex die 10, a number of steam vents are formed with an appropriate pitch to introduce steam to heat expandable resin particles when forming an expanded molding.

While the above description was made for the manufacturing method of the convex die 10, the concave die 20 may be manufactured in the same manner as the convex die 10.

Figure 13:
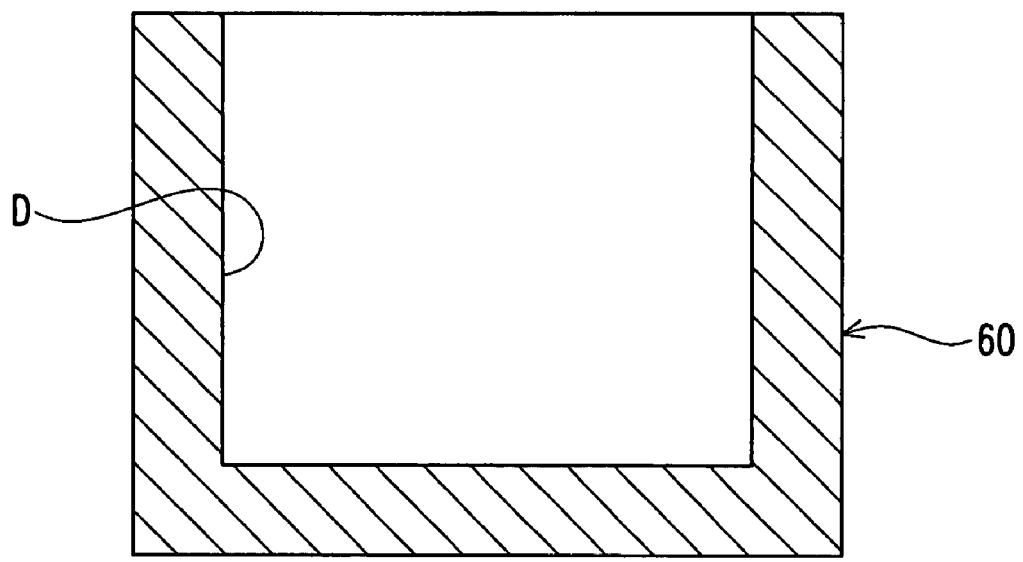
FIG. 13 is a cross sectional view illustrating a wooden mold (master mold) for a concave mold, of the same embodiment.

Specifically, as illustrated in FIG. 13, a wooden mold 60 having a shape corresponding to the concave die 20 is prepared. The wooden mold 60 is fabricated by machining wood or the like using an appropriate cutting tool or the like.

Figure 14:
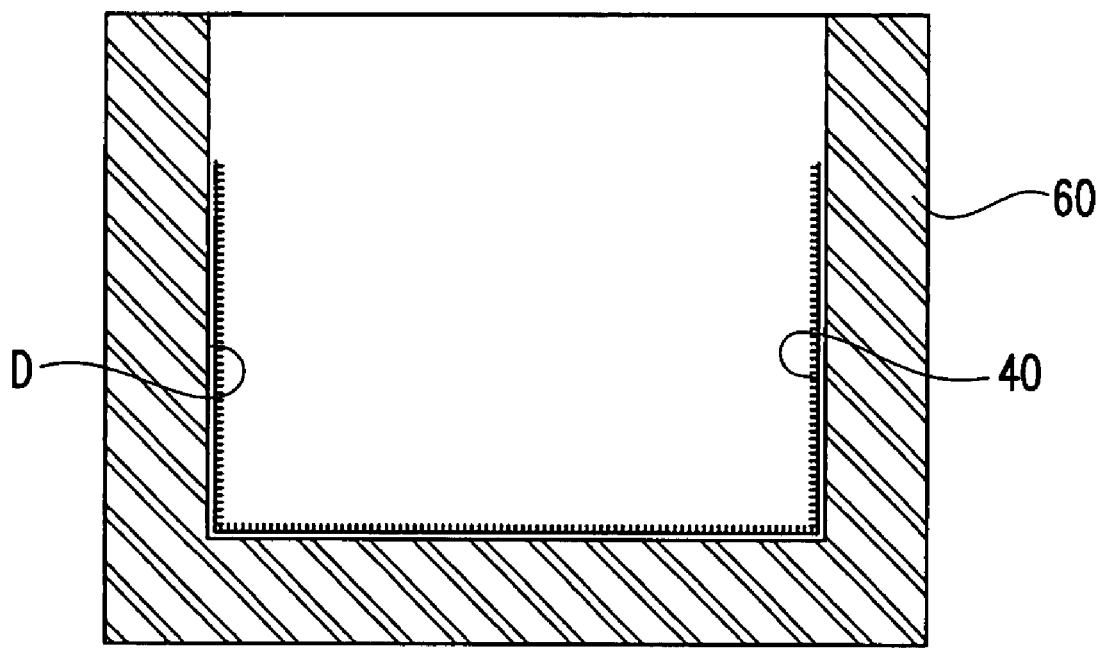
FIG. 14 is a cross sectional view illustrating a wooden mold for a concave mold with a meshed member fixed thereto, of the same embodiment.

Then, as illustrated in FIG. 14, the meshed member 40 is bonded to an inner surface (molding surface) D of the wooden mold 60 by adhesive or the like.

Then, although not shown, a sand mold is fabricated by using the wooden mold 60 in the same manner as the convex die 10. Whereby, a protrusion and recess pattern transferred from the meshed member 40 is formed on a surface (molding surface) corresponding to the molding surface D of the wooden mold 60 in the sand mold.

Figure 15:
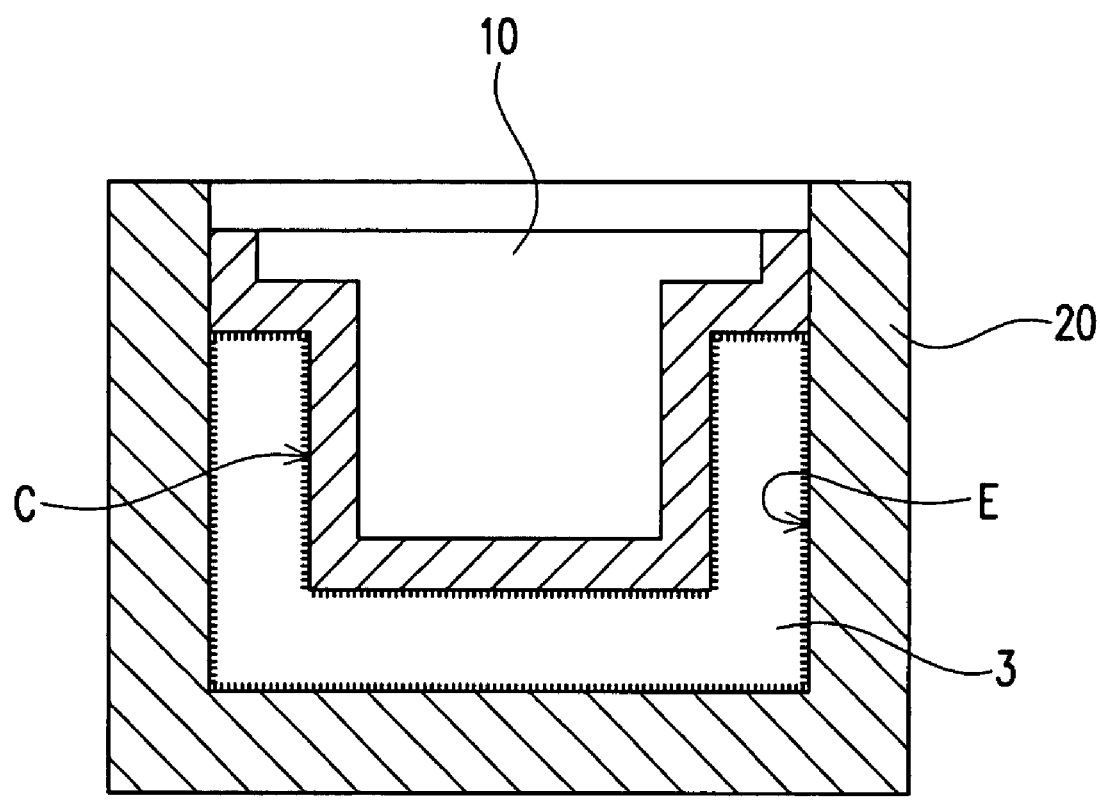
FIG. 15 is a cross sectional view illustrating a molding die in a die closing position, of the same embodiment.

Then, the concave die 20 as illustrated in FIGS. 1 and 15 is cast by the casting using the thus fabricated sand mold (although not shown). Whereby, a protrusion and recess pattern transferred from the sand mold is formed on a surface (molding surface) E corresponding to the molding surface of the sand mold in the concave die 20. For a material of the concave die 20, aluminium or aluminium alloy is used in the same manner as the convex die 10. Although not shown in the concave die 20, a number of steam vents are formed with an appropriate pitch to introduce steam to heat expandable resin particles when forming an expanded molding.

Thus, as illustrated in FIG. 1, the convex die 10 and the concave die 20 are respectively manufactured. Then, as illustrated in FIG. 15, the convex die 10 is fitted to the concave die 20 and they are closed, thereby forming a molding cavity 3 therebetween, into which expandable resin particles are filled. Then, the expandable resin particles within the cavity 3 are heated, expanded and fused by heating medium such as steam. Thus, an expanded molding is formed. At this moment, a protrusion and recess pattern is transferred from the molding surfaces of both the dies 10, 20 onto the surface of the expanded molding without modification or change.

Thus, according to this embodiment, since the meshed member 40 using a meshed (lattice-shaped), flexible synthetic resin sheet having a number of mesh openings 41 is fixed to the molding surface A of the wooden mold 30 as a master mold of the convex die 10, the linear elements of the meshed member 40, which define the meshes, are not overlapped and intersected with each other unlike a wire mesh. Therefore, the meshed member 40 is tightly fixed to the wooden mold 30 so that it is possible to prevent gaps from being caused between the wooden mold 30 and the meshed member 40. Accordingly, when the sand mold 50 is fabricated using the wooden mold 30, the molding sands 53 are unlikely to invade between the wooden mold 30 and the meshed member 40, and therefore any trouble, such as break of the sand mold 50 when the wooden mold 30 is pulled out, is unlikely to occur. Whereby, it is possible to manufacture the convex die 10 having the molding surface formed with a highly excellent protrusion and recess pattern.

Furthermore, according to this embodiment, since the meshed member 40 using a meshed (lattice-shaped), flexible synthetic resin sheet having a number of mesh openings 41 is fixed to the molding surface D of the wooden mold 60 as a master mold of the concave die 20, the linear elements of the meshed member 40, which define the meshes, are not overlapped and intersected with each other unlike a wire mesh. Therefore, the meshed member 40 is tightly fixed to the wooden mold 60 so that it is possible to prevent gaps from being caused between the wooden mold 60 and the meshed member 40. Accordingly, when the sand mold is fabricated using the wooden mold 60, the molding sands are unlikely to invade between the wooden mold 60 and the meshed member 40, and therefore any trouble, such as break of the sand mold when the wooden mold 60 is pulled out, is unlikely to occur. Whereby, it is possible to manufacture the concave die 20 having a protrusion and recess pattern formed with a highly excellent and clear appearance on the molding surface.

In this embodiment, the linear elements 42 defining the meshes (mesh openings 41) of the meshed member 40 to be fixed to the wooden mold (master mold) 30 respectively have raised intersection portions 43 on the second side defining protrusions, thereby forming the second side with protrusions and recesses. Whereby, in addition to the protrusion and recess pattern transferred from the meshed pattern of the meshed member 40 to the sand mold 50, it is possible to transfer the uneven shapes of the respective linear elements 42 including protrusions (ridges) to the dies 10, 20.

In other words, on the surfaces (molding surfaces) C, E, the linear elements 42 defining the meshes (mesh openings 41) are respectively formed with raised intersection portions 43 on the second side defining protrusions while defining recesses between the intersection portions 43. In the thus formed protrusion and recess pattern, portions corresponding to the meshes (meshed openings 41) are most deeply recessed while portions corresponding to tops of the protrusions (ridges) are most outwardly projected, and therefore the surfaces extending in the protruding direction continuously from both the portions each contain a surface corresponding to the thickness of the linear elements 42 of the meshed member 40, so that a great difference in height between the meshes (mesh openings 41) and the intersection portions 43 of the linear elements 42 is produced. Therefore, a protrusion and recess pattern is deeply and clearly transferred onto the sand mold and thereby the protrusion and recess pattern of the dies 10, 20 is transferred without modification or change to an expanded molding U formed by using the dies 10, 20 manufactured by using these sand molds. Thus, the expanded molding U can have a remarkably clear protrusion and recess pattern.

Partially cross sectional views of the expanded molding U formed by the dies 10, 20 are illustrated in FIGS. 11 and 12. As illustrated in these Figures, the expanded molding U formed by the dies 10, 20 in the embodiment of the present invention has a surface to which a lattice-shaped protrusion and recess pattern by the meshed member 40 is transferred, so that, for the intersection portions of a lattice, portions that become deepest portions (valley portions) relative to the inner side are formed at the lattice-shaped intersection portions by the protrusions 43d (the same reference numeral is also used) of the dies 10, 20. Therefore, even in the expanded molding U, its protrusion and recess pattern is remarkably significant with the thickness t of the linear elements 42. FIG. 11 illustrates a flat molding surface for each of the dies 10, 20, and FIG. 12 illustrates a curved molding surface of each of the dies 10, 20. For the dies 10, 20 and the expanded molding U, of this embodiment of the present invention, a protrusion and recess pattern clearly appears even when they are of any of a plain surface and a three-dimensional surface (curved surfaces).

While the above description was made for the embodiment of the present invention, it is not necessary to limit the present invention to the above embodiment. For example, in the above embodiment, the meshed member 40 is fixed to the entirety of each of the molding surfaces A and D of the wooden molds 30, 60 as master molds for the convex die 10 and the concave die 20, but the meshed member 40 may be fixed to a part of each of the molding surfaces A and D of the wooden molds 30 and 60.

In the above embodiment, only one side of the meshed member 40, through which the meshed member 40 is fixed to the wooden molds 30 and 60, is flatly formed, but the other side of the meshed member 40 may also be flatly formed.

Furthermore, a mesh (mesh opening 41) of the meshed member 40 is not necessarily limited to a specific shape, but may be shaped into a rectangle or circle. Accordingly, when a rectangular mesh is employed, the width of each of the linear elements defining the meshes is constant in the longitudinal and width directions, but when a circular mesh is employed, the width of each of the linear elements defining the meshes is varied in the longitudinal and width directions.

Example 1

An HDPE resin net (Trical (Registered trademark) Net N-2: manufactured by Takiron Co., Ltd.)) having a mesh opening size of 1.8 mm×1.8 mm and no overlapped intersections is fixed to a molding surface (outer surface) of a wooden mold having a convex shape of 250 mm×250 mm×100 mm by adhesive. The thus obtained wooden mold is placed within a sand-mold-fabricating frame and molding sands (Mikawa Silica Sand No. Toku-7, 70 mesh: manufactured by Mikawa Silica Sand Kabushiki Kaisha) are filled in the sand-mold-fabricating frame so as to have the wooden mold buried. The molding sands are integrated by filling carbon dioxide gas, thus manufacturing a sand mold. Then, molten aluminium is poured into a molding cavity formed by combining the sand molds, and a cast made of aluminium having a thickness of 10 mm was fabricated. Steam vents each having a diameter of 0.8 mm are formed by a drill with a pitch of 25 mm in a molding surface having a protrusion and recess pattern, of the cast, and thus a convex molding die was manufactured. The thus obtained convex molding die was incorporated as a core die into an expansion molding machine.

Then, an HDPE resin net (Trical (Registered trademark) Net N-2: manufactured by Takiron Co., Ltd.)) having a mesh opening size of 1.8 mm×1.8 mm is fixed to a molding surface (outer surface) of a wooden mold for a concave die, having a size of 300 mm×300 mm×150 mm by adhesive. The thus obtained wooden mold is placed within a sand-mold-fabricating frame and molding sands (Mikawa Silica Sand No. Toku-7, 70 mesh: manufactured by Mikawa Silica Sand Kabushiki Kaisha) are filled in the sand-mold-fabricating frame so as to have the wooden mold buried. The molding sands are integrated by filling carbon dioxide gas, thus manufacturing a sand mold. Then, molten aluminium is poured into a molding cavity formed by combining the sand molds, and a cast made of aluminium having a thickness of 10 mm was manufactured. Steam vents each having a diameter of 0.8 mm are formed by a drill with a pitch of 25 mm in a molding surface having a protrusion and recess pattern, of the cast, and thus a concave molding die was prepared. The thus obtained concave molding die was incorporated as a cavity die into the expansion molding machine.

Then, pre-expanded resin particles of a styrene-modified polyethylene resin (PIOCELAN (Registered trademark): manufactured by Sekisui Plastics Co., Ltd., expansion ratio: 30 times) were filled by a cracking filing method from a filling machine into a molding cavity with a gap of 3 mm between the core die and the cavity die, of the expansion molding machine, and then both the core die and the cavity die were closed. Then, a molding was made following the conditions mentioned below.

[Molding Conditions]
Heating in one way: 0.8 MPa
Heating in a reverse way: 0.8 MPa
Heating in both ways: 1.0 MPa
Water cooling: 20 s
Standing to cool: 100 s The thus obtained expanded molding has a die pattern (protrusion and recess pattern) having a size of 1.8 mm×1.8 mm transferred onto the entire surface thereof, having an excellent appearance, an insignificant honeycomb pattern of expandable resin particles and excellent feel of touch.

Comparative Example 1

A net made of an HDPE resin, and having overlapped portions and mesh openings each having a size of 1.8 mm×1.8 mm, is fixed to a molding surface of a wooden mold illustrated in Example 1 by adhesive. The thus obtained wooden mold is placed within a sand-mold-fabricating frame and molding sands (Mikawa Silica Sand No. Toku-7, 70 mesh: manufactured by Mikawa Silica Sand Kabushiki Kaisha) are filled in the sand-mold-fabricating frame so as to have the wooden mold buried. The molding sands are integrated by filling carbon dioxide gas and a sand mold is thus manufactured. Since the molding sands invaded into gaps between the net and the wooden mold and therefore a sand mold was broken when the wooden mold was pulled out, a protrusion and recess pattern could not been transferred from the net to the sand mold.

Comparative Example 2

An attempt was made to fix a punching metal having mesh openings each having a size of 1.8 mm×1.8 mm to a molding surface of a wooden mold of Example 1, but it could not been conformed to a curved shape or the like of the wooden mold due to the hardness of the punching metal and therefore a sand mold could not been fabricated.

The invention claimed is:

1. A method of manufacturing a molding die for molding an expanded molding made of a thermoplastic resin, comprising fixing a meshed member to an entirety or part of a molding surface of a master molding, fabricating a sand mold having a molding surface with a protrusion and recess pattern thereon by using the master mold, and then casting a molding die having a molding surface with a protrusion and recess pattern thereon by using the sand mold, wherein
   a meshed resin sheet having a number of mesh openings is used as the meshed member.

2. The method of manufacturing the molding die according to claim 1, wherein the sheet has linear elements that form meshes, said linear elements are formed flat on a first side of the sheet, and said sheet is fixed to the master mold to have the first side thereof positioned inward.

3. The method of manufacturing the molding die according to claim 2, wherein the sheet has linear elements that form meshes, said linear elements are formed with protrusions and recesses on a second side of the sheet, and said sheet is fixed to the master mold to have the first side thereof positioned inward.

4. The method of manufacturing the molding die according to claim 3, wherein the linear elements respectively have raised intersection portions defining protrusions, and recesses between the intersection portions, on the second side of the sheet.

5. The method of manufacturing the molding die according to claim 1, wherein the sheet has linear elements that form meshes, said linear elements are formed with protrusions and recesses on a second side of the sheet, and said sheet is fixed to the master mold to have the first side thereof positioned inward.

6. The method of manufacturing the molding die according to claim 5, wherein the linear elements respectively have raised intersection portions defining protrusions, and recesses between the intersection portions, on the second side of the sheet.

* * * * *